Figure 1:
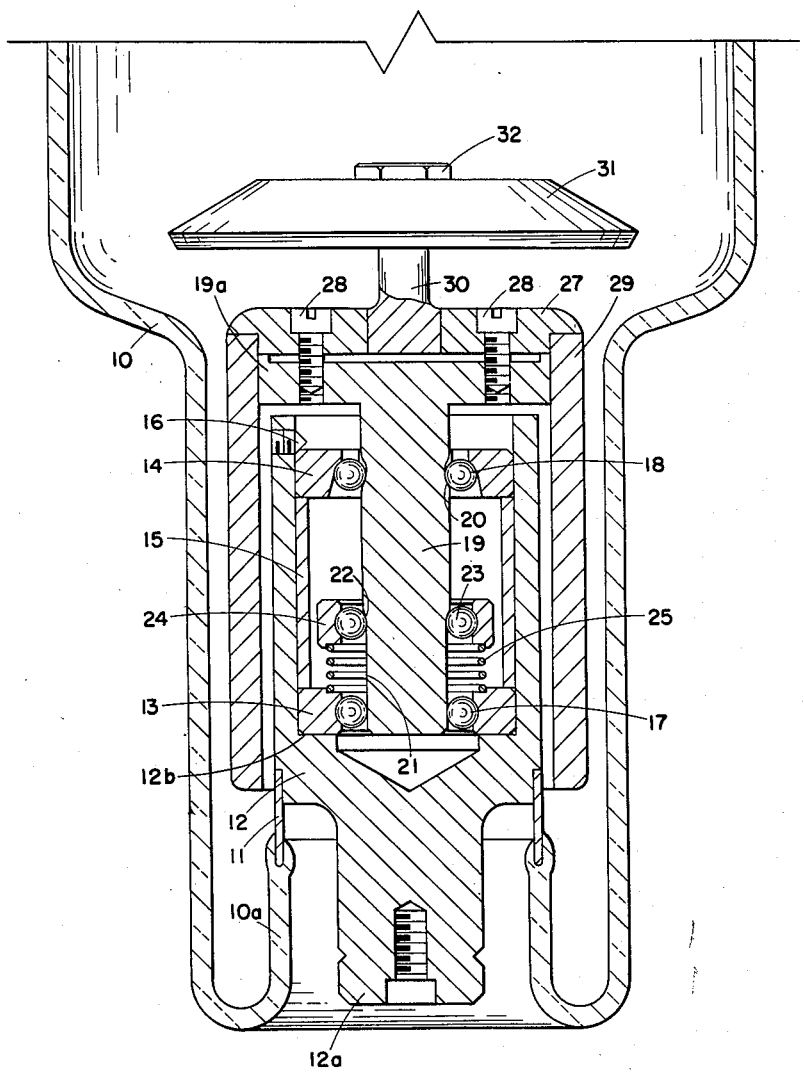

Patented Jan. 13, 1953

2,625,664

UNITED STATES PATENT OFFICE 2,625,664

ELECTRON TUBE

George J. Agule, Stamford, Conn., assignor to Machlett Laboratories, Incorporated, Springdale, Conn., a corporation of Connecticut Application July 25, 1951, Serial No. 238,514

5 Claims. (Cl. 313—60)

This invention relates to an electron tube having an evacuated envelope and rotatable electrode therein. More particularly this invention concerns a mounting for the rotatable electrode.

It is the primary object of this invention to eliminate sliding friction between all moving parts in electron tubes containing a rotatable electrode.

In particular it is my object to eliminate sliding in the mounting for the rotatable electrode.

It is also my object to provide a bearing structure which will have long life and which will minimize those factors which in general give poor tube performance and shorten life. To this end I have combined in a novel manner features of prior inventions described in my U. S. patent applications Serial Numbers 152,371 and 194,841.

Under non-vaccum conditions most friction problems may be solved by the selection of an appropriate lubricant. Under vacuum tube conditions, however, the choice of lubricants is quite limited. Metallic lubricants have been used almost exclusively for vacuum tube purposes because of their non-volatile nature even at high temperatures and negligible pressures. Unfortunately, although metallic lubricants are excellent for preventing wear due to rolling friction, they are unsatisfactory for preventing wear due to sliding friction. In sliding, the metallic lubricant is rubbed aside, so that bare metallic surfaces are exposed. When metallic surfaces slide upon one another at high temperatures they tend to form a weld between themselves. Although motion usually continues so that weld is broken, the roughened surfaces left tend to cause wear.

Sliding has been particularly serious in rotatable electrode mountings within the races between adjacent balls and between the balls and the races. In my United States patent application Serial No. 153,371, sliding between the movable race and its support may result in the sticking or welding together of the two parts. If the movable race of this construction is unable to adjust its axial position, the advantage of a movable race is lost. In fact, if the race sticks at one end of its range or the other, it may lead to damage of the structure. If stuck at one end of its range, differential expansion may produce sufficient pressure to crack some part of the electrode mounting structure. If stuck at the other end, expansion may produce a loosening of the structure to a point where the balls are no longer forced up the sloping races. When the balls are no longer mutually separated and held snugly in place between their races, sliding friction will again take place at the bearing surfaces.

My invention employs a race containing a set of balls which race is movable in a direction parallel to the axis of rotation. As in the invention described in my United States patent application Serial No. 153,371, a spring is arranged to apply pressure to move this race. Unlike the structure of that application, however, my new movable race is mounted out of contact with both of the relatively rotatable members. Two other races containing two other sets of balls are mounted upon one relatively rotatable member of the mounting for a rotatable electrode, against which member or some appendage of which the aforementioned spring is advantageously terminated. Thus it is possible to employ various types of races on the other relatively rotatable member opposing the races aforementioned.

Two of the inner races advantageously are oppositely disposed slope type races. Use of this type of race eliminates sliding friction between the bearing surfaces, whether ball to ball or race to ball. The pressure parallel to the tube axis which is applied to the movable race causes the balls to run up the sloping side walls thereby holding the balls snugly in mutually non-contacting relationship between their inner and outer races. A third inner race opposing a fixed outer race is advantageously a cylindrical surface similar to the type of race described in my U. S. patent application Serial No. 194,841.

For a better understanding of this invention reference is made to the following drawing:

Fig. 1 illustrates a rotatable electrode which may be used within a vacuum tube structure and which employs my novel bearing construction.

The electrode shown in Fig. 1 is similar to other rotatable electrodes found within vacuum envelopes. It is the rotatable anode or target structure for use in a rotatable target X-ray tube. Within the same vacuum envelope such a tube would include a cathode element for producing a stream of electrons which impinge the target surface at some point near its periphery thus producing X-rays.

A reentrant portion 10a of the glass envelope 10 is sealed to Kovar collar 11 which in turn is sealed to housing member 12. Housing member 12 has an external shank 12a which may be used for electrical connection and for cooling purposes. The housing itself is of hollow tube-like construction and is advantageously constructed of copper in order to provide a low impedance path to the outside of the vacuum envelope for the purpose of cooling the bearings. The housing contains outer race members 13 and 14 which are separated by tubular spacer 15 which may also be made of metal which will help compensate differential expansion effects. One race 13 is placed against a radial shoulder 12b within the housing. The pair of outer races and their spacer are held in place by set screws 16 located adjacent race member 14 at various points around the housing. The outer races 13 and 14 contain balls of bearing steel 17 and 18 respectively which may be coated with silver or other metal for lubrication purposes as described in U. S. Patent No. 2,354,763. These balls run directly upon bearing metal shaft 19 in which is cut grooved type race 20 for retaining the balls 18. Race 20 has side walls having a greater radius of curvature than the balls so that it effectively presents a concave slope up which the balls may ride. The balls 17 ride directly upon a cylindrical bearing surface 21 which is produced by a reduction in diameter of shaft 19 advantageously located at one end of the inner race assembly. Between the larger diameter of shaft 19 and its smaller diameter bearing surface 21 is a concave slope-type race 22 having a slope race as described in my U. S. patent application Serial No. 153,371 similar to that of race 20 but oppositely disposed. Balls 23 are held in place against this slope type race 22 by outer race 24 which has an outer diameter sufficiently small so that it in no way contacts the housing 12 or any appendage thereof, axial forces being applied to outer race 24 through spring member 25 which may press against outer race 13 as shown or against the housing 12 or any appendage of the housing. The axial force applied to race 24 by spring 25 tends to force balls 23 up slope race 22 and balls 18 up slope race 20 in opposition thereto. Thus the balls are separated from one another and a snug fit is maintained between the balls 18 and 23 and their respective races so that no sliding may occur therebetween. With no sliding present, there will be no deformation and rubbing aside of the silver lubricant upon the balls. Hence there will be no unlubricated metallic surfaces which might come in contact and tend to weld together with resultant abrasion and wear.

The central bearing metal shaft 19 has a radial flange 19a at one end outside the housing. This flange fits against shoulder 27 and is affixed thereto by axial screws 28. A heavy tubular copper member 29 is affixed to shoulder 27 such that it surrounds housing 12. At the other side of shoulder 27, axial support stem 30 supports tungsten target 31 which is held in place by locknut 32 which engages a threaded portion of the stem 30 and thus retains target 31 against a small shoulder.

In actual operation the copper tubular member 29 acts as a rotor of an induction motor the rotating field of which is supplied by a surrounding stator external of the tube envelope. The extreme heating of target 31 due to electron bombardment consequently heats all metallic anode parts thereby causing their expansion. However, because of the poor conduction through the various balls to the outer races, the outer race structure tends to expand less rapidly than the inner race structure. Thus it may be supposed that the greater initial expansion of shaft 19 will cause axial movement of balls 23 and outer races 24 thereby compressing spring 25. Upon further heating of the outer race structure its increased expansion will provide some relief for spring 25. It may be seen that various heating effects will cause various degrees of differential expansion between outer and inner races, thus necessitating the movement of outer race 24 if the pressure upon the balls of the slope type race is to remain essentially constant. Outer races 13 and 14 need not move in order to keep this pressure essentially constant, but race 24 must do so. However, by virtue of my novel construction it is free to move back and forth axially without sliding friction occurring between the outer diameter of the outer race and its housing.

It will be apparent to one skilled in the art that various schemes and arrangements of races may be employed to accomplish this same end. However, my invention encompasses any means of accomplishing this end which employs more than two outer races and which has an axially movable outer race out of direct contact with the retaining housing resiliently mounted against some appendage of the retaining housing so as to supply pressure in an axial direction, this axial force being employed to force balls in at least two of the races up slope type inner races.

I claim:

1. An electron tube having an evacuated envelope and a rotatable electrode therein, and a mounting for the rotatable electrode including two relatively rotatable members one extending within the other, three sets of balls between said members and three races for the three sets of balls, two of said races being mounted on one of said members and the third one being mounted out of contact with that member, a spring arranged to apply pressure to said third race to move in a direction parallel to the axis of rotation, and three opposing races on the other of said members including a pair of oppositely disposed slope type races one of which is opposite said third race.

2. An electron tube having an evacuated envelope and a rotatable electrode therein, the mounting for the rotatable electrode including an inner race assembly which affords two oppositely disposed slope-type inner races and a cylindrical inner race, a generally cylindrical housing for retaining an outer race assembly, three independent outer races, two of which are affixed in position within the cylindrical housing and the third of which does not contact the housing at any point and is positioned opposite one of the slope-type inner races, a spring member pressing upon the third outer race to move it in a direction parallel to the tube's axis, and balls retained between the inner and outer races, those retained by the third outer race and one of the other outer races being forced up the slopes of two of the inner races by the axial spring pressure.

3. An electron tube having an evacuated envelope and a rotatable electrode therein, the mounting for the rotatable electrode including an inner race assembly which affords two oppositely disposed slope-type inner races and a cylindrical race at one end of the assembly, a generally cylindrical housing for retaining an outer race assembly, three independent outer races, two of which are fixed in position within the cylindrical housing and the third of which is located between the other two outer races out of contact with the housing and is positioned opposite one of the slope-type inner races, a spring member for maintaining pressure upon the third outer race to move it in a direction parallel to the tube's axis, and balls retained between the inner and outer races, those retained by the third outer race and one of the other outer races being forced up the slopes of two of the inner races by the said axial spring pressure.

4. An electron tube having an evacuated envelope and a rotatable electrode therein, and a mounting for the rotatable electrode including two relatively rotatable members one extending within the other and each member supporting three ball bearing races, one of which races is axially movable relative to its supporting member, a spring member extending between said axially movable race and its supporting member, and three sets of balls within said races and between said members.

5. An electron tube having an evacuated envelope and a rotatable electrode therein, and a mounting for the rotatable electrode including two relatively rotatable members one extending within the other and each member supporting three ball bearing races, one of which races is out of contact with its supporting member except for a spring extending between said race and said member, and three sets of balls within said races and between said members.

GEORGE J. AGULE.

REFERENCES CITED

The following references are of record in the file of this patent:

UNITED STATES PATENTS

| Number | Name | Date |
|---|---|---|
| 2,141,924 | Middel | Dec. 27, 1938 |
| 2,216,888 | Machlett | Oct. 8, 1940 |
| 2,230,858 | Atlee | Feb. 4, 1941 |
| 2,361,897 | De Graaf | Oct. 31, 1944 |